US012688317B2

(12) United States Patent
Ufkes et al.

(10) Patent No.: US 12,688,317 B2
(45) Date of Patent: Jul. 21, 2026

(54) SYSTEM AND METHOD FOR ELECTRONIC ACCESS CONTROL IN MESH NETWORKED SITES

(71) Applicant: Security Enhancement Systems, LLC, Northbrook, IL (US)

(72) Inventors: Philip J. Ufkes, Sullivan's Island, SC (US); Matthew Frank Trapani, Deerfield, IL (US); Matthew Paul, Palatine, IL (US); Zachary A. Cornelius, Northbrook, IL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 230 days.

(21) Appl. No.: 17/974,889

(22) Filed: Oct. 27, 2022

(65) Prior Publication Data

US 2023/0130876 A1 Apr. 27, 2023

Related U.S. Application Data

(60) Provisional application No. 63/275,859, filed on Nov. 4, 2021, provisional application No. 63/272,423, filed on Oct. 27, 2021.

(51) Int. Cl.
*H04L 9/40* (2022.01)
*G06F 21/62* (2013.01)

(52) U.S. Cl.
CPC ................................ *G06F 21/6218* (2013.01)

(58) Field of Classification Search
CPC ......... G06F 21/6218; G07C 9/20; G07C 9/27; H04L 63/105; H04L 63/1425;
(Continued)

(56) References Cited

U.S. PATENT DOCUMENTS 8,331,544 B2 * 12/2012 Kraus ................. H04L 12/2836
340/5.71
9,666,000 B1 5/2017 Schoenfelder et al.
(Continued)

OTHER PUBLICATIONS

Invitation to Pay Additional Fees, International application No. PCT/US22/48018. Date of mailing: Apr. 17, 2023. ISA/US, Alexandria, VA.

(Continued)

*Primary Examiner* — Maung T Lwin
*Assistant Examiner* — Mudasiru K Olaegbe
(74) *Attorney, Agent, or Firm* — Gregory Finch; Finch Paolino, LLC

(57) ABSTRACT

A mesh networked site process management system and method that provides for enforcement of a predefined access methodology by utilizing mesh networking through all possible touchpoints within a site perimeter and compound. Certain embodiments of the present disclosure comprise various computerized components communicably connected via a highly secured mesh network, in which only approved devices are able to participate on a machine-to-machine basis. The network may allow each device to coordinate its activity state with all other devices in the network. If a user desires to interact with one or more devices in the network, then the user must follow agreed upon process steps in order to do so. The user interacts with each network authorized device via a separate communication outside of the highly secured mesh network in order to transfer data to and from each network authorized device for the purposes of electronic access control.

20 Claims, 9 Drawing Sheets

(58) Field of Classification Search
    CPC .. H04L 63/107; H04W 12/009; H04W 12/47;
                    H04W 12/64; H04W 12/082
    See application file for complete search history.

(56)                    References Cited

U.S. PATENT DOCUMENTS

| | | | | |
|---|---|---|---|---|
| 2010/0318685 | A1* | 12/2010 | Kraus | H04L 12/2834 |
| | | | | 709/249 |
| 2015/0287256 | A1* | 10/2015 | Davis | G07C 9/00309 |
| | | | | 340/5.25 |
| 2015/0350902 | A1* | 12/2015 | Baxley | H04B 17/318 |
| | | | | 726/7 |
| 2017/0228953 | A1* | 8/2017 | Lupovici | G07C 9/00896 |
| 2017/0249794 | A1* | 8/2017 | Davis | H04L 63/0861 |
| 2018/0103039 | A1* | 4/2018 | Thaler | H04L 41/0806 |
| 2018/0232976 | A1* | 8/2018 | Schoenfelder | H04L 63/08 |
| 2019/0371096 | A1* | 12/2019 | Fisher | G07C 9/00904 |
| 2020/0053096 | A1 | 2/2020 | Bendersky et al. | |
| 2020/0358471 | A9* | 11/2020 | Sharma | H04W 52/0235 |
| 2021/0144517 | A1* | 5/2021 | Guim Bernat | G06F 9/5072 |
| 2021/0152543 | A1* | 5/2021 | Doshi | G06N 20/00 |
| 2021/0217303 | A1* | 7/2021 | Davis | H04W 12/08 |
| 2022/0343707 | A1* | 10/2022 | Johnson | G07C 9/00896 |
| 2023/0084106 | A1* | 3/2023 | Sobol | G07C 9/29 |
| | | | | 340/5.61 |

OTHER PUBLICATIONS

International search report and Written Opinion of the International Searching Authority, International application No. PCT/US22/48018. Date of mailing: Jun. 29, 2023. ISA/US, Alexandria, VA.

* cited by examiner

500

Detect unauthorized access/ divergence from access procedure 502

Revoke/block access to network device(s) 504

Communicate event data to user(s) 506

Process compliance data to determine event status 508

Low: Full authorization, out of sequence 510

Medium: Partial authorization 512

High: No authorization, breach 514

SYSTEM AND METHOD FOR ELECTRONIC ACCESS CONTROL IN MESH NETWORKED SITES

CROSS-REFERENCE TO RELATED APPLICATIONS

This application claims the benefit of U.S. Provisional Application Ser. No. 63/272,423, filed on Oct. 27, 2021, entitled "SYSTEM AND METHOD FOR ELECTRONIC ACCESS CONTROL IN MESH NETWORKED SITES," and this application claims the benefit of U.S. Provisional Application Ser. No. 63/275,859, filed on Nov. 4, 2021, entitled "SYSTEM AND METHOD FOR ELECTRONIC ACCESS CONTROL IN MESH NETWORKED SITES, the disclosures of which are hereby incorporated in their entireties at least by virtue of this reference.

FIELD

The present disclosure relates to the field of electronic access control systems; more particularly, systems, methods and devices for electronic access control management utilizing mesh networking through all possible touchpoints within an electronically access-controlled perimeter and compound.

BACKGROUND

A mesh network is a local network topology in which the infrastructure nodes (i.e., bridges, switches, and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event a few nodes should fail. This in turn contributes to fault-tolerance and reduced maintenance costs.

Electronic access control (EAC) is the technology used to provide and deny physical or virtual access to a physical or virtual space. EAC provides technology for various security applications, including, controlling who can go where and when; controlling traffic in and out of areas; restricting and granting access to authorized persons and granular user roles; restricting and granting access to authorized vehicles and networked devices; and administering accountability rules and specified access procedures and protocols. Electronically access-controlled sites often comprise various EAC locking devices that are communicably engaged via a mesh network architecture. Currently, remotely located, geographically dispersed sites of high value assets lack a localized way to enforce site access procedures that ensure access integrity and process compliance as well as improve site security, safety and workflow management.

Through applied effort and ingenuity, Applicant has developed a solution for improved management of electronic access control devices within a mesh network architecture.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present certain exemplified embodiments of the invention in a simplified form as a prelude to the more detailed description that follows.

Certain aspects of the present disclosure provide for an electronic access control method comprising one or more steps or operations for enforcement of a predefined access methodology by utilizing mesh networking through all possible touchpoints within and across a secured site. In accordance with certain aspects of the present disclosure, the method may include one or more steps or operations for establishing (e.g., with a mobile electronic device) a data transfer interface between the mobile electronic device and a perimeter access point device. The perimeter access point device may comprise a node in a mesh network, wherein the mesh network comprises a plurality of electronic access control devices configured to electronically secure one or more access points for a location. The method may include one or more steps or operations for receiving (e.g., with the perimeter access point device) an access credential communicated from the mobile electronic device via the data transfer interface. The method may include one or more steps or operations for processing (e.g., with at least one processor communicably engaged with the perimeter access point device) the access credential to authorize or deny perimeter access to a user of the mobile electronic device and authorize or deny access to at least one electronic access control device in the plurality of electronic access control devices. The method may include one or more steps or operations for communicating (e.g., with the perimeter access point device in response to authorizing access to the at least one electronic access control device) one or more assigned task or state changes to the plurality of electronic access control devices in the mesh network. The method may include one or more steps or operations for receiving (e.g., with at least one server communicably engaged with the perimeter access point device) an acceptance of the one or more assigned task or state changes from the plurality of electronic access control devices. In certain embodiments, the plurality of electronic access control devices are communicably engaged with the at least one server in the mesh network. The method may include one or more steps or operations for updating (e.g., with the at least one server) one or more alarm system parameters in response to the one or more assigned task or state changes. The method may include one or more steps or operations for granting (e.g., with the at least one server) perimeter access to the user of the mobile electronic device at the perimeter access point device.

In accordance with certain aspects of the present disclosure, the method may include one or more steps or operations for monitoring (e.g., with at least one sensor or camera communicably engaged with the at least one server in the mesh network) a plurality of access event data from the at least one electronic access control device in the plurality of electronic access control devices. In certain embodiments, the plurality of access event data is stored at the at least one server. The method may include one or more steps or operations for granting (e.g., with the at least one server) access to at least one specified electronic access control device in the plurality of electronic access control devices in response to granting perimeter access to the user of the mobile electronic device at the perimeter access point device. In certain embodiments, the one or more steps or operations for updating the one or more alarm system parameters may include one or more steps or operations for suppressing an alarm for the perimeter access point device and at least one specified electronic access control device in the plurality of electronic access control devices. The method may include one or more steps or operations for establishing (e.g., with the mobile electronic device) a second data transfer interface between the mobile electronic device and the at least one specified electronic access control device. In accordance with certain aspects of the present disclosure, the user may access the at least one specified electronic access control device in response to establishing the second data transfer interface. The method may include one or more steps or operations for receiving (e.g., with the at least one server) at least one input indicative of completion of the one or more assigned task from one or both of the at least one specified electronic access control device and the perimeter access point device. The method may include one or more steps or operations for configuring (e.g., with the at least one server) the plurality of electronic access control devices in the mesh network to a first state in response to receiving the at least one input indicative of completion of the one or more assigned task from one or both of the at least one specified electronic access control device and the perimeter access point device.

Further aspects of the present disclosure may provide for an electronic access control system comprising a mobile electronic device associated with a user of the electronic access control system, a server communicably engaged with the mobile electronic device to communicate one or more electronic access credentials to the mobile electronic device, and a plurality of electronic access control devices operably installed at a secured location comprising at least one perimeter access point. In accordance with certain aspects of the present disclosure, the plurality of electronic access control devices is communicably engaged with the server in a mesh network configuration and the at least one electronic access control device in the plurality of electronic access control devices comprises a perimeter access point device for the secured location. The mobile electronic device may be configured to provide an electronic access credential to the perimeter access point device. The perimeter access point device may be configured to process the electronic access credential to grant or deny access to a perimeter access point for the secured location. The perimeter access point device may be configured to assign one or more task or configure at least one state change for the plurality of electronic access control devices. In accordance with certain embodiments, each electronic access control device in the plurality of electronic access control devices may configured to communicate an acceptance of the one or more task or the at least one state change to the perimeter access point device. In certain embodiments, the server may be configured to update one or more alarm system parameters in response to the one or more task or the at least one state change. The perimeter access point device may be configured to grant access to the at least one perimeter access point and one or more specified electronic access control device in the plurality of electronic access control devices according to the electronic access credential.

In accordance with certain aspects of the present disclosure, the electronic access control system may comprise at least one motion sensor or camera installed in the secured location. The at least one motion sensor or the camera may be communicably engaged with the server. The server may be configured to store data received from the at least one motion sensor or the camera in response to the user of the electronic access control system accessing the at least one perimeter access point. The mobile electronic device may be configured to communicate the electronic access credential to the one or more specified electronic access control device. The one or more specified electronic access control device in the plurality of electronic access control device may be configured to grant access to the user in response to receiving the electronic access credential from the mobile electronic device. In certain embodiments, the at least one alarm system may be communicably engaged with the server, wherein the at least one alarm system is operably installed at the secured location. The server may be configured to suppress an alarm associated with the perimeter access point device and the one or more specified electronic access control device. The one or more specified electronic access control device may be configured to communicate one or more activity data inputs to one or both of the server and the perimeter access point device. The one or more activity data inputs may comprise a confirmation that the one or more specified electronic access control device has been returned to a locked state. The server may be configured to restore the plurality of electronic access control devices to a prior state in response to processing the confirmation that the one or more specified electronic access control device has been returned to the locked state. The server may be configured to assign the at least one electronic access control device in the plurality of electronic access control devices as the perimeter access point device for the secured location. The server may be configured to assign one or more alternative perimeter access point devices in the plurality of electronic access control devices.

Still further aspects of the present disclosure provide for an electronic access control method comprising one or more steps or operations for automatically actuating one or more electronic access control devices within a mesh network according to proximity of an authorized user. The electronic access control method may comprise one or more steps or operations for establishing (e.g., with a mobile electronic device) a wireless data transfer interface between the mobile electronic device and a first electronic access control device in a plurality of electronic access control devices, wherein the plurality of electronic access control devices are communicably engaged in a mesh network. The first electronic access control device may comprise. a perimeter access device for a secured location. The method may comprise one or more steps or operations for receiving (e.g., with the first electronic access control device) an electronic access credential for accessing the first electronic access control device from the mobile electronic device. The electronic access credential may comprise an identifier for the mobile electronic device, wherein the first electronic access control device is configured to store the identifier for the mobile electronic device. The electronic access control method may comprise one or more steps or operations for processing (e.g., with the first electronic access control device) the electronic access credential. The first electronic access control device may be configured to grant access to a user of the mobile electronic device in response to authenticating the electronic access credential. The electronic access control method may comprise one or more steps or operations for configuring (e.g., with the first electronic access control device via the mesh network) a temporary access authorization for a specified electronic access control device in the plurality of electronic access control devices. The first electronic access control device may be configured to communicate the identifier for the mobile electronic device to the specified electronic access control device via the mesh network, wherein the specified electronic access control device is configured to store the identifier for the mobile electronic device. The electronic access control method may comprise one or more steps or operations for receiving (e.g., with the specified electronic access control device) a wireless signal from the mobile electronic device, wherein the wireless signal comprises the identifier for the mobile electronic device. The electronic access control method may comprise one or more steps or operations for granting access to the specified electronic access control device according to the temporary access authorization.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
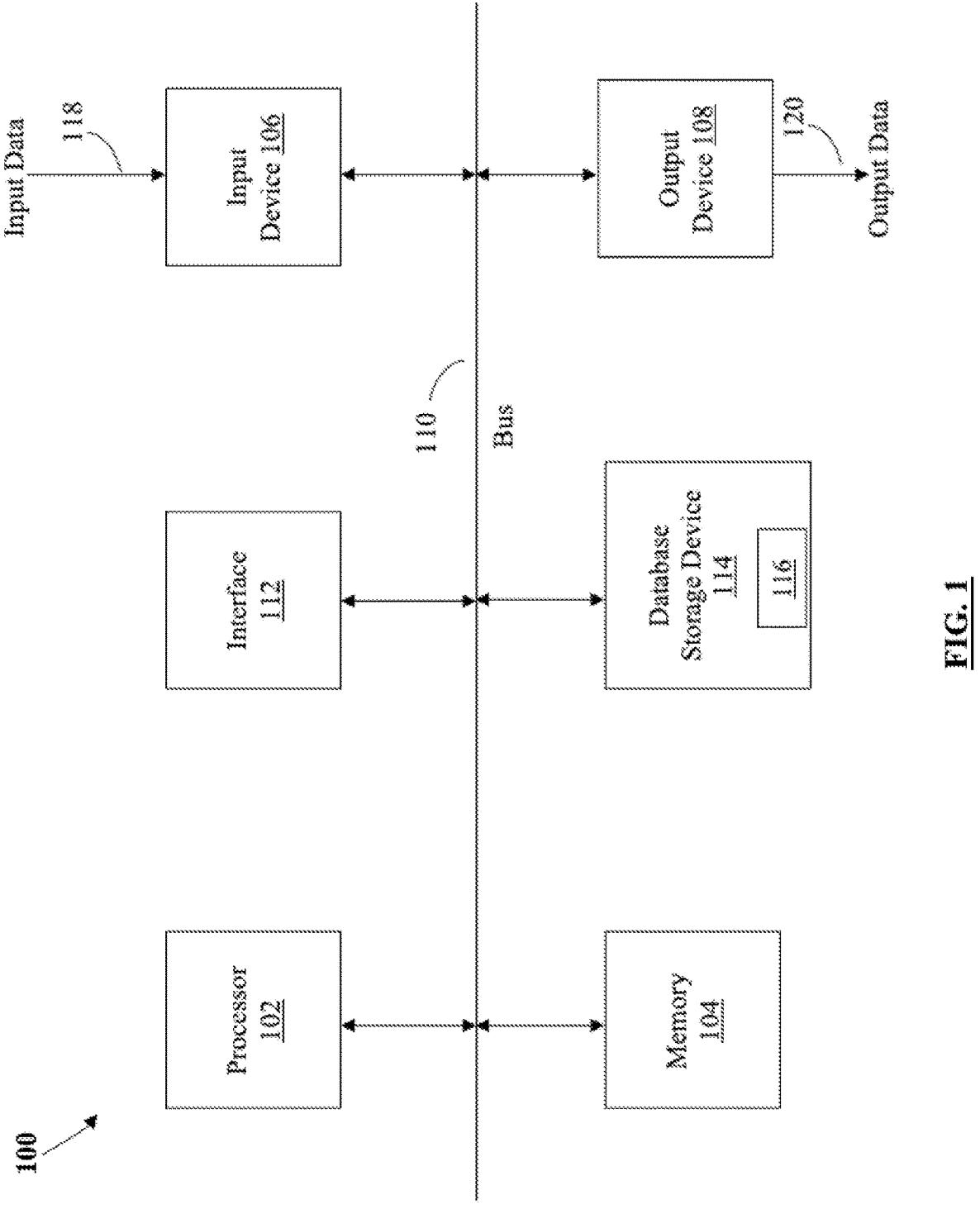
FIG. 1 is a block diagram of a computing device through which one or more aspects of the present disclosure may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, a mesh networked site process management system and method that provides for enforcement of a predefined access methodology by utilizing mesh networking through all possible touchpoints within an entire site perimeter and compound. Certain embodiments of the present disclosure comprise various computerized components communicably connected via a highly secured mesh network, in which only approved devices are able to participate on a machine-to-machine basis. In accordance with certain aspects of the present disclosure, the network allows each device to coordinate its activity state with all other devices in the network. If a user desires to interact with one or more devices in the network (e.g., request electronic access control), then the user must follow agreed upon process steps in order to do so. The user interacts with each network authorized device via a separate communication outside of the highly secured mesh network (e.g., BLE, NFC, and the like) in order to transfer data to and from each network authorized device for the purposes of electronic access control.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, an access point, a container, an enclosure, a cabinet, and/or the like to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "interface" refers to any shared boundary across which two or more separate components of a computer system may exchange information. The exchange can be between software, computer hardware, peripheral devices, humans, and combinations thereof.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one Bluetooth advertisement channel.

As used herein, the term "native" refers to any software program that is installed on a mobile electronic device.

As used herein, the term "peripheral device" refers to any internal or external device that connects directly to a computer but does not contribute to the computer's primary function. In certain embodiments, a peripheral device may include any electronic access control device configured to receive one or more commands from a controller. In certain embodiments, a peripheral device may include any electronic access control device configured to establish a communications interface with a mobile electronic device. In certain embodiments, a peripheral device may include any device configured to connect to a central device over a wireless communications interface, such as BLUETOOTH and BLUETOOTH low energy (BLE). In certain embodiments, a peripheral device may include an electronic device configured to transmit an advertisement. In certain device interactions, the same device may constitute a peripheral device in some instances and a central device in other instances.

As used herein, the term "central device" refers to any electronic device configured to establish a communications interface with a peripheral device. In certain embodiments, a central device may include an electronic device configured to receive an advertisement from a peripheral device.

As used herein, the term "mesh network" refers to any local area network topology in which two or more infrastructure nodes (i.e., bridges, switches, and other infrastructure devices) connect directly, dynamically and non-hierarchically to as many other nodes as possible and cooperate with one another to efficiently route data to and from clients.

Certain benefits and advantages of the present disclosure include a system and method for localized enforcement of site access procedures configured to ensure access integrity and process compliance as well as to improve site security, safety and workflow management.

Certain illustrative embodiments of the present disclosure include methods, systems, apparatuses and computer-readable program products configured to enable execution of operations of a security process enforced by a mesh network to enable a user wants to enter an electronically-controlled perimeter access point of a secured site or location and access one or more pieces of equipment secured with an electronic access control device located therein. In accordance with certain aspects of the present disclosure, a user workflow requires a user to check-in to a perimeter access point (PAP) device (e.g., an electronic gate) of the secured site or location for the purpose of performing work on a specified asset (e.g., a cabinet battery door) located at the secured location and ensures that the specified asset and PAP device are closed/locked in order to successfully check-out of the secured site or location.

In accordance with certain aspects of the present disclosure, the system, method and/or apparatus may include a plurality of steps or operations comprising one or more business workflow or system routine. In accordance with certain embodiments, the one or more business workflow or system routine may be initiated in response to a user approaching a PAP device at the secured site or location. The user may execute one or more steps or operations to obtain/provide an electronic access credential to the PAP device; for example, via Near Field Communication (NFC), BLUETOOTH low energy (BLE), a mobile electronic device, keypad, radio frequency identifier (RFID), other means of wireless or wired network communications. In accordance with certain aspects of the present disclosure, the PAP device may perform a multi-step process based on the credential. One or more steps of the multi-step process may be sequential, concurrent and/or non-sequential. 1) The PAP device may execute one or more steps or operations to process the electronic access credential received by a user and authenticate the user's access request to perimeter of the site (e.g., a gate secured by an electronic access control device). 2) The PAP device may execute one or more steps or operations to authorize the user's access to the site and type of activity to be performed on a specified asset located within the site. 3) The PAP device may execute one or more steps or operations to communicate with one or more assets (i.e., devices) in the network to communicate one or more parameters for an assigned task (i.e., specified parameters for access by the user) and operational mode or state in which the asset should be engaged. 4) The PAP device may execute one or more steps or operations to receive an acceptance of the assignment from each device to which the assignment is communicated within the mesh network. 5) The PAP device may execute one or more steps or operations to configure one or more alarm system settings for the PAP device and the specified asset to be accessed (e.g., cabinet door). 6) Upon completion of the preceding steps, the PAP device may execute one or more steps or operations to enable access to the perimeter of the secured location (e.g., actuate an electronic locking device).

In accordance with certain aspects of the present disclosure, the system may comprise one or more motion sensors and/or cameras installed and the secured location and, optionally, communicably engaged in the mesh network. The system may perform one or more steps or operations for commanding the motion sensors and/or cameras to continue to monitor all events during the user's access. A system server and/or other controller may process the sensor/camera inputs as authorized events (i.e., not a breach) and may store event data in memory as a log or audit trail of the user's access to the site. The other assets located at the site (e.g., cabinets and shelter doors, etc.) may continue to remain in a locked/restricted state, while the specific asset to which the user is granted access is configured to an unlocked or accessible state. The non-authorized assets (e.g., devices) that are not to be accessed either do not advertise for access or alternatively do not accept credentials. In certain embodiments, the non-authorized assets may be configured in a lockdown state unless the user has certain privileges to override the lockdown. In accordance with certain aspects of the present disclosure, the system may be configured to suppress an alarm for one or more perimeter access points and the specific door of the specific cabinet (i.e., asset) to be accessed by the user.

In accordance with certain workflows/routines of the present system and/or method, the user may enter the site, proceed to the cabinet (e.g., specific asset), connect (e.g., via BLUETOOTH connectivity of a mobile electronic device) with the cabinet lock on the specific door to work, perform work (e.g., authorized task), and close and locks the cabinet door. The system and/or method may comprise one or more steps or operations in which a controller of the cabinet locking device sends a communication (e.g., signal) via the mesh network to notify the PAP device (e.g., gate lock) that the specified asset (e.g., cabinet door) is closed and locked. In accordance with certain workflows/routines of the present system and/or method, the user may proceed to PAP. The PAP device (e.g., the gate lock device) knows the cabinet access process has been completed and allows user to close and lock the PAP device and check out of the site. All devices in the mesh network may then be configured to their previous state (e.g., the motion alarms and video cameras are active and will notify breaches if triggered and the specified access returns to a locked/restricted state). In accordance with certain embodiments, the mesh network and, optionally, one or more cloud servers receives event data in real-time and stores all event data in a database or datastore, including check-in and check-out.

In accordance with certain aspects of the present disclosure, if at any point a user deviates from the prescribed process or workflow (for example, the user fails to receive authorization at the PAP device or fails to proceed to the correct cabinet door), the system will not support access and may notify the user and one or more other users that a non-compliance event is occurring. Based on which process step was not followed, the system will rate the urgency of the lack of compliance.; for example, Low (e.g., Full authorization out of sequence), Medium (e.g., Partial authorization) or High (e.g., No authorization, breach).

Certain embodiments of the present disclosure may be operably installed, for example, at a remotely located edge data center. In said embodiments, the PAP may be a gate and the PAP device may be an electronically-controlled gate lock. When the user goes to the remotely located edge data center, there may be a 2-door system, wherein the first door needs to accept the user access credential before the second door will be activated to allow the user to be validated for access. This protocol enforces each user to first be authorized by the PAP device before a secondary device can be accessed. In accordance with certain embodiments, the system and method are configured wherein (1) the user is granted access to the first door, (2) the first door is opened, then closed and locked, and (3) then the second door will accept/allow an access request from the user. The user may then request access to the second door and, if the electronic access credentials are authenticated/verified, the second door is unlocked.

In accordance with certain aspects of the present disclosure, the disclosed system and method provides for a mesh networking protocol that enables one or more backup process steps. In an example where a PAP device is present, if the PAP device is not functioning, then a secondary or tertiary device (or subsequent device) may be configured by the system to assume its role. A server communicably engaged with the devices in the mesh network may comprise one or more protocols for automatically assigning a secondary device (or subsequent device) as the PAP device in the event that the primary PAP device fails to communicate with the server and/or fails to receive communication from the user device (client device).

In accordance with certain aspects of the present disclosure, an electronic access control system and method may be configured to execute one or more automatic access protocols across one or more electronic access control devices in a mesh network. In accordance with certain networking protocols, one meshed device can be a PAP device that authorizes access for a user to other electronic access control devices (node devices) in the mesh network. When the user physically approaches the other device(s), it automatically processes a BLUETOOTH advertisement (or other wireless communication protocol) to determine the identity of a user (or user device) and unlock the device without needing to perform all the necessary authorizations steps. The identifier can be achieved through BLE and/or other wireless devices that have an application that quickly sends the user identifier for that temporary access session.

In accordance with certain aspects of the present disclosure, the PAP device may perform a multi-step process based on the credential. One or more steps of the multi-step process may be sequential, concurrent and/or non-sequential. In accordance with certain aspects of the present disclosure, the user approaches the PAP device. The user provides an electronic access credential comprising at least one access code (e.g., via a wireless communications interface on a mobile electronic device) to the PAP device. The PAP device receives the electronic access credential and authorizes the user. In certain embodiments, the user's mobile electronic device may be configured to communicate a BLUETOOTH advertisement comprise a data packet containing a unique identifier associated with the user's mobile electronic device. The PAP device may store the electronic access credential and the unique identifier in a transitory or non-transitory storage medium of the PAP device. The PAP device may send a communication, via the mesh network, to one or more other electronic access devices in the mesh network. The communication may comprise an access permission for the one or more other electronic access devices in the mesh network. The access permission may comprise a time value during which the one or more other electronic access devices may automatically unlock upon recognizing the device advertisement from the user's mobile electronic device. In accordance with certain aspects of the present disclosure, the user may proceed to unlock the access point secured by the PAP device, enter the secured site and proceed to the specified asset (e.g., a cabinet). The locking device of the specified asset (e.g., the cabinet locking device) may receive the BLUETOOTH advertisement, recognize the user ID/mobile device ID and the locking device of the specified asset may unlock automatically without the requirement to verify/authenticate additional credentials from any backend servers. In accordance with certain embodiments, access event audit trail information is synchronized with the backend servers when the user is connected to the Internet via their mobile device.

In accordance with certain aspects of the present disclosure, an electronic access control system and method may be configured to execute one or more protocols for remotely unlocking one or more electronic access control device communicably engaged in a mesh network. In accordance with certain embodiments, a device in the mesh network may comprise PAP device. In certain embodiments, one or more devices in the mesh network may engage with the network via a cellular connection (LTE, 5G) to the Internet. In said embodiments, the PAP device may periodically communicate to one or more backend cloud or enterprise servers via a web interface according to one or more communication protocols. In said embodiments, a support user at a network operations center (NOC) may receive a phone call from a visiting technician at a site in proximity to the PAP device securing a PAP (e.g., a gate). The visiting technician may request access to the PAP device and the support user may sign into a server application and send an unlock command to at least one device in the mesh network having a cellular network connection. The at least one device in the mesh network having the cellular network connection may then send a message via BLE on the mesh network to unlock the PAP device securing the gate. The user may then unlock the gate and enter while the PAP and the at least one device in the mesh network having the cellular network connection record an access event audit trail in real-time or periodically to the back-end servers. In accordance with certain end user workflows or system routines of the present embodiment, a technician user may approach a PAP device securing a gate or other access point. The technician user may make a phone call or other communication to a NOC user to request access to the PAP device or other access point. The NOC user executes a command at a server application to grant access and the server may communicate an unlock command to the cellular device at the site. The cellular device may communicate the unlock command/authorization to the PAP device and the PAP device may actuate an electronic locking device to grant access to the technician user to the PAP. The PAP device may track all events and send access information through mesh network to the cellular device. The cellular device may update the back-end server at designated intervals or in real-time. In certain embodiments, other devices on the network may also send information to the cellular device to record various site activities.

Turning now descriptively to the drawings, in which similar reference characters denote similar elements throughout the several views, FIG. 1 depicts a computing system in which certain illustrated embodiments of the present invention may be implemented.

Referring now to FIG. 1, a processor-implemented computing device in which one or more aspects of the present disclosure may be implemented is shown. According to an embodiment, a processing system 100 may generally comprise at least one processor 102, or a processing unit or plurality of processors, memory 104, at least one input device 106 and at least one output device 108, coupled together via a bus or a group of buses 110. In certain embodiments, input device 106 and output device 108 could be the same device. An interface 112 can also be provided for coupling the processing system 100 to one or more peripheral devices, for example interface 112 could be a PCI card or a PC card. At least one storage device 114 which houses at least one database 116 can also be provided. The memory 104 can be any form of memory device, for example, volatile or non-volatile memory, solid state storage devices, magnetic devices, etc. The processor 102 can comprise more than one distinct processing device, for example to handle different functions within the processing system 100. Input device 106 receives input data 118 and can comprise, for example, a keyboard, a pointer device such as a pen-like device or a mouse, an audio receiving device for voice-controlled activation such as a microphone, data receiver or antenna such as a modem or a wireless data adaptor, a data acquisition card, etc. Input data 118 can come from different sources, for example keyboard instructions in conjunction with data received via a network. Output device 108 produces or generates output data 120 and can comprise, for example, a display device or monitor in which case output data 120 is visual, a printer in which case output data 120 is printed, a port, such as for example a USB port, a peripheral component adaptor, a data transmitter or antenna such as a modem or wireless network adaptor, etc. Output data 120 can be distinct and/or derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. In general, the processor 102 can receive instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 can be communicated to other devices via the network. The transfer of information and/or data over the network can be achieved using wired communications means or wireless communications means. A server can facilitate the transfer of data between the network and one or more databases. A server and one or more database(s) provide an example of a suitable information source.

Thus, the processing computing system environment 100 illustrated in FIG. 1 may operate in a networked environment using logical connections to one or more remote computers. In embodiments, the remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the invention may be implemented. That is, FIG. 1 is but an example of a suitable environment and is not intended to suggest any limitations as to the structure, scope of use, or functionality of embodiments of the present invention exemplified therein. A particular environment should not be interpreted as having any dependency or requirement relating to any one or a specific combination of components illustrated in an exemplified operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms data or maintains it at locations in the memory system of the computer, which reconfigures or otherwise alters the operation of the computer in a manner that is conventionally understood by those skilled in the art. The data structures in which data is maintained are physical locations of the memory that have particular properties defined by the format of the data. However, while certain embodiments may be described in the foregoing context, the scope of the disclosure is not meant to be limiting thereto, as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with embodiments of the invention include, but are not limited to, personal computers, handheld or laptop devices, personal digital assistants, multiprocessor systems, microprocessor-based systems, set top boxes, programmable consumer electronics, networks, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, description will now turn towards illustrated embodiments of the present invention which generally relate to systems and methods for electronic access control within a highly secured mesh network of electronic access control devices. It is to be understood and appreciated that certain aspects of the methods described herein comprise establishing, with a mobile electronic device, a data transfer interface between the mobile electronic device and a perimeter access point device, wherein the perimeter access point device comprises a node in a mesh network, wherein the mesh network comprises a plurality of electronic access control devices configured to electronically secure one or more access points for a location; receiving, with the perimeter access point device, an access credential communicated from the mobile electronic device via the data transfer interface; processing, with at least one processor communicably engaged with the perimeter access point device, the access credential to authorize or deny perimeter access to a user of the mobile electronic device and authorize or deny access to at least one electronic access control device in the plurality of electronic control devices; communicating, with the perimeter access point device in response to authorizing access to the at least one electronic access control device, one or more assigned task or state changes to the plurality of electronic access control devices in the mesh network; receiving, with the at least one processor communicably engaged with the perimeter access point device, an acceptance of the one or more assigned task or state changes from the plurality of electronic access control devices in the mesh network; updating, with the perimeter access point device, one or more alarm system parameters in response to the one or more assigned task or state changes; and granting perimeter access to the user of the mobile electronic device at the perimeter access point device.

Figure 2:
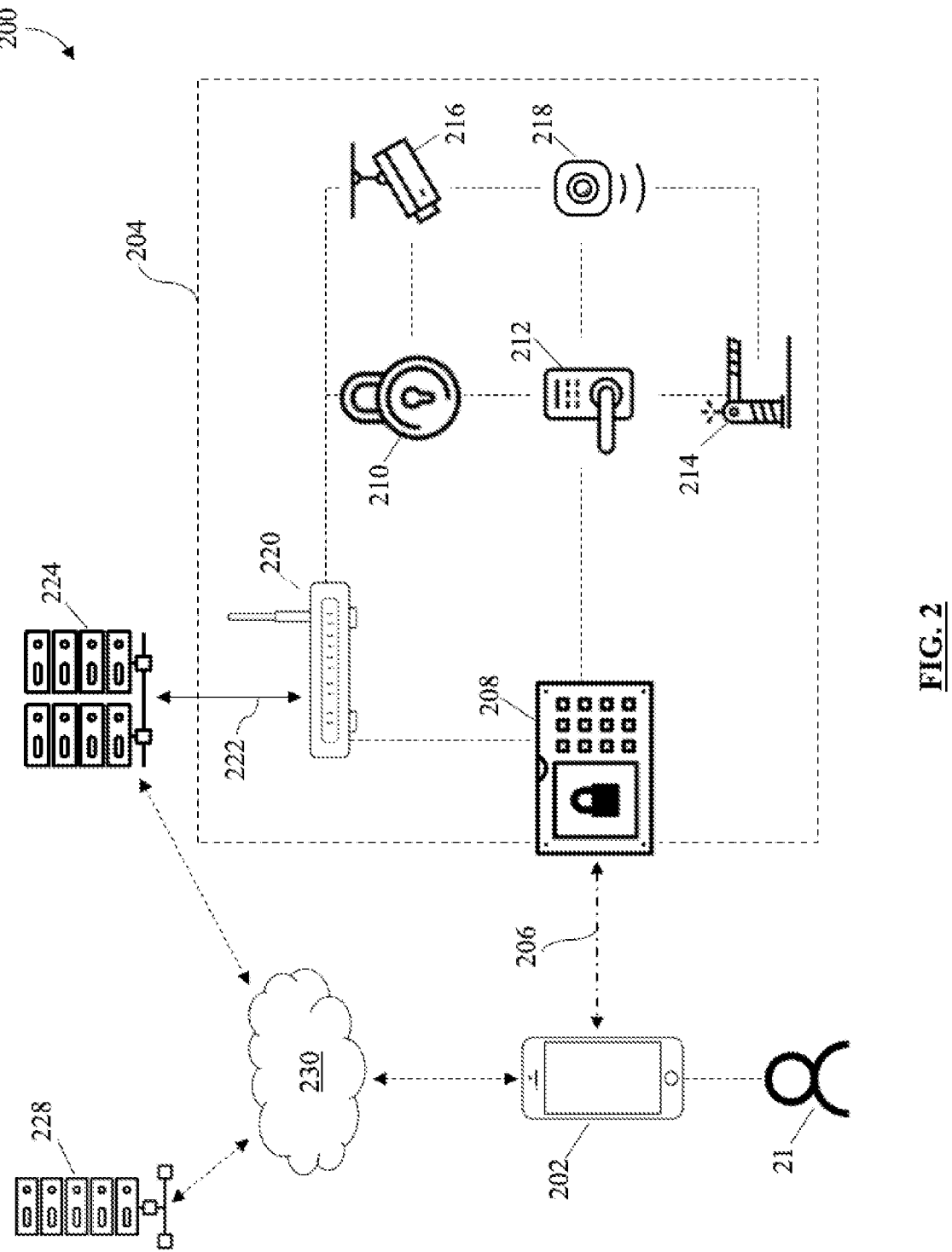
FIG. 2 is an architecture diagram of a mesh-networked site process management system, in accordance with certain aspects of the present disclosure.

Referring now to FIG. 2, an architecture diagram of a mesh-networked site process management system 200 is shown. In accordance with certain aspects of the present disclosure, system 200 may comprise a client device 202 communicably engaged with a perimeter access point (PAP) device 208 via a data transfer interface 206. Data transfer interface 206 may comprise a wireless communications interface, such as WiFi, BLE, NFC and the like. PAP device 208 may comprise a perimeter access point for a secured location comprising a mesh network 204 of electronic devices. In accordance with various aspects of the present disclosure, electronic devices communicably engaged over mesh network 204 may include, but are not limited to, an electronically-actuated access/egress equipment, such as locks or latches for gates or doors; one or more devices for securing a shelter, cabinet or other enclosure, such as hasps, shackles and the like; one or more items of site equipment, such as generators, antennas and vehicles; one or more building access and control components, such as controllers and sensors; one or more local or remote servers; one or more security system components, such as cameras, motion sensors, environmental sensors, sirens and alarms; networking equipment, such as WiFi, ethernet, LORA, cellular network and other wireless routers, equipment and hubs or gateways; and fire and safety equipment. In accordance with an illustrative, non-limiting example, mesh network 204 may comprise PAP device 208, a first EAC device 210, a second EAC device 212, an Nth EAC device 214, a security camera 216, a motion sensor 218 and a gateway device 220. In accordance with certain aspects of the present disclosure, gateway device 220 may be configured to establish a network communications protocol and data transfer interface between each of the electronic devices in mesh network 204. In certain embodiments, the network communications protocol may comprise a wireless communications protocol such as LoRA or WiFi. In accordance with certain aspects of the present disclosure, gateway device 220 may be communicably engaged with at least one local or remote EAC server 224 via network interface 222.

Still referring to FIG. 2, system 200 may be operably configured such that client device 202 may be communicably engaged with an application server 228 via a communications network 230 to send and receive one or more electronic access control data for communication to and from PAP device 208. In accordance with certain aspects of the present disclosure, a user 21 of client device 202 may approach PAP device 208 and establish data transfer interface 206 via low energy BLUETOOTH, mobile device, keypad, RFID, wired or other means of wireless or wired interface. User 21 may obtain credential data from application server 228 to access the perimeter of mesh network 204 and one or more electronic access control devices; for example, first EAC device 210. User 21 may command client device 202 to share the credential data with PAP device 208 via data transfer interface 206. Upon receiving the credential data, PAP device 208 may perform one or more operations to process the credential data comprising one or more data processing steps. In accordance with certain aspects of the present disclosure, the one or more data processing steps may include one or more steps for (a) authorizing access to the perimeter to user 21; (b) authorizing access and type of activity to a device to user 21; (c) communicating with the electronic devices in mesh network 204 on the upcoming assigned task and state with which each device should engage; (d) receiving and processing acceptance of assignments from each electronic device in mesh network 204; (e) configuring alarm system components for perimeter and cabinet door for authorized access; and (f) enabling access to the perimeter for user 21. In accordance with certain aspects of the present disclosure, motion sensor 218 and security camera 216 are tasked with monitoring and storing all events during perimeter access, without categorizing the activities as an active breach. In the example where user 21 is provided credentials for accessing first EAC device 210, first EAC device 210 is selectively configured to grant access to user 21 while second EAC device 212 and Nth EAC device 214 maintain a locked/armed state. The electronic devices in mesh network 204 that are not to be accessed either do not advertise for access or do not accept credentials from client device 202 and may optionally go into a lockdown state unless/until user 21 has certain privileges to override lockdowns. In accordance with certain aspects of the present disclosure, system 200 may be further configured wherein alarming is suppressed for PAP device 208 and first EAC device 210 during the authorized access event by user 21. Upon suppressing the alarm and granting access, user 21 may proceed to enter the site, proceed to the enclosure secured by first EAC device 210, connect with first EAC device 210 to access the enclosure, perform authorized work, close the enclosure and configure first EAC device 210 back to a locked state. Upon returning to a locked state, first EAC device 210 notifies PAP device 208 via mesh network 204 that the enclosure is closed and first EAC device 210 is locked. User 21 may then proceed to PAP device 208 and, upon processing the closeout/lock state of first EAC device 210, PAP device 208 may enable user 21 to complete a check-out workflow for the site. Upon completing the check-out workflow for the site, all electronic devices in mesh network 204 return to their previous state (e.g., motion sensor 218 and security camera 216 are active and will notify breaches if triggered). In accordance with certain aspects of the present disclosure, client device 202 and gateway 220 may communicate with application server 228 and EAC server 224, respectively, to send event and access data in real-time. Application server 228 and EAC server 224 may be configured to receive and store all access data and events in real-time, including check-in and check-out.

Figure 3:
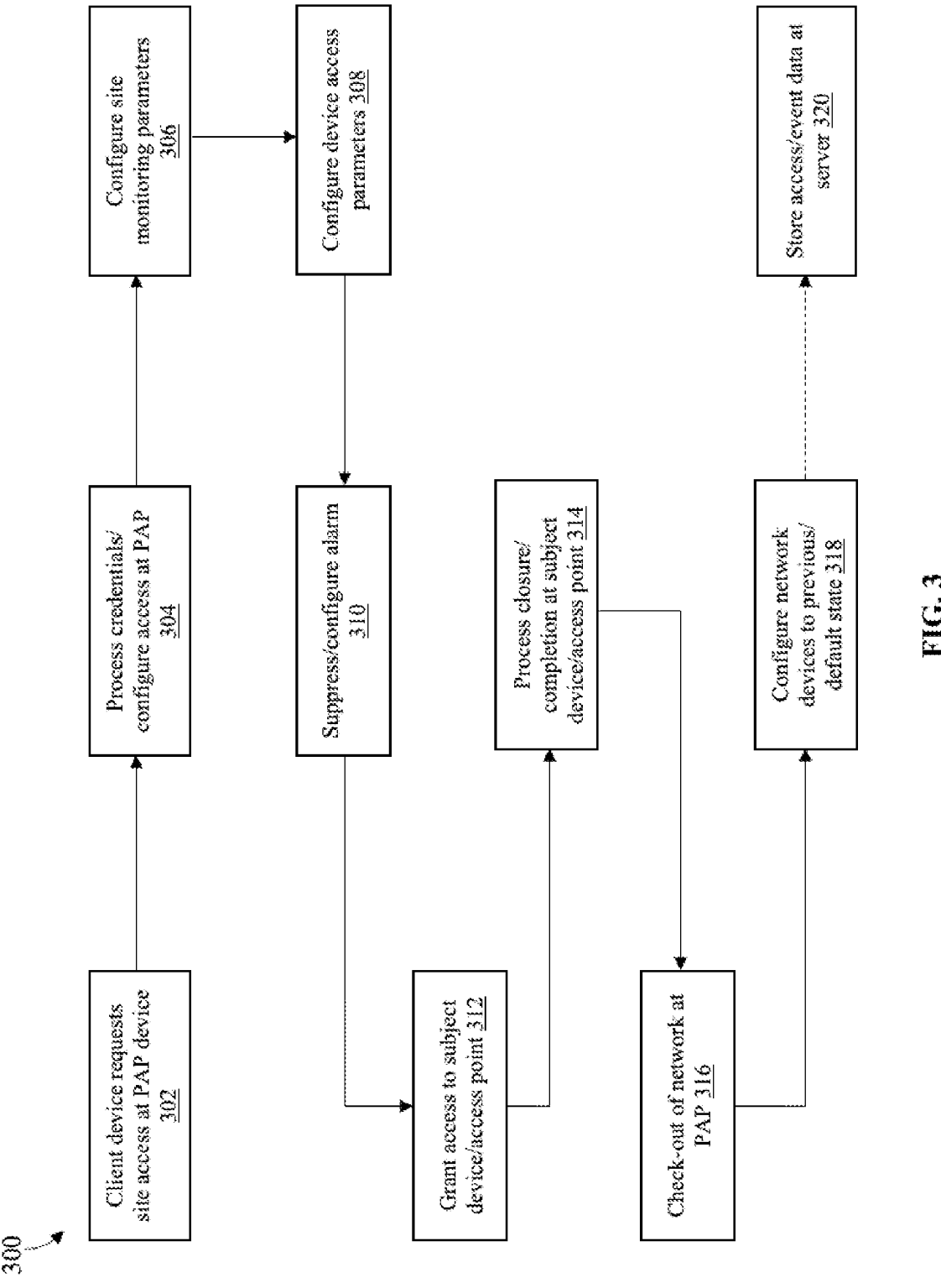
FIG. 3 is a process flow diagram of a routine within a mesh-networked site process management system, in accordance with certain aspects of the present disclosure.

Referring now to FIG. 3, a process flow diagram of a routine 300 within a mesh-networked site process management system is shown. In accordance with certain aspects of the present disclosure, the mesh-networked site process management system may comprise mesh-networked site process management system 200, as shown in FIG. 2 and one or more steps or operations of routine 300 may be executed across one or more system components of system 200. In accordance with certain aspects of the present disclosure, routine 300 may comprise one or more steps or operations for a client device to communicate a site access request comprising access credentials to a PAP device at a perimeter access point of a secured location comprising a mesh network of electronic devices comprising one or more EAC devices (Step 302). Routine 300 may proceed by executing one or more steps or operations for processing the access credentials at the PAP device and configuring one or more access permissions/protocols for a user of the client device (Step 304). Routine 300 may continue by executing one or more steps or operations for configuring one or more site monitoring parameters for one or more electronic devices in the mesh network (Step 306), such as one or more security cameras or motion sensors. Routine 300 may continue by executing one or more steps or operations for configuring one or more device access parameters for one or more subject or non-subject devices in the mesh network and/or access points at the site (Step 308). Routine 300 may continue by executing one or more steps or operations for suppressing and/or configuring one or more alarm system components in the mesh network during the period of authorized access by the user at the site (Step 310). Routine 300 may continue by executing one or more steps or operations for granting access to one or more subject electronic devices in the mesh network and/or one or more access points at the site to an authorized user of the client device (Step 312). After the user has accessed the subject device/access point for the authorized purpose, routine 300 may continue by executing one or more steps or operations for processing one or more closure/completion steps at the subject electronic device and/or access point (Step 314). Routine 300 may continue by executing one or more steps or operations for providing a check-out workflow to a user of the client device at the PAP device (Step 316). Upon completing/processing the check-out workflow, routine 300 may continue by executing one or more steps or operations for configuring each of the electronic devices in the mesh network to a previous or default operational/machine state (Step 318). Routine 300 may continue by executing one or more steps or operations for storing access and event data from the user access to the mesh network at one or more local or remote servers (Step 320).

Figure 4:
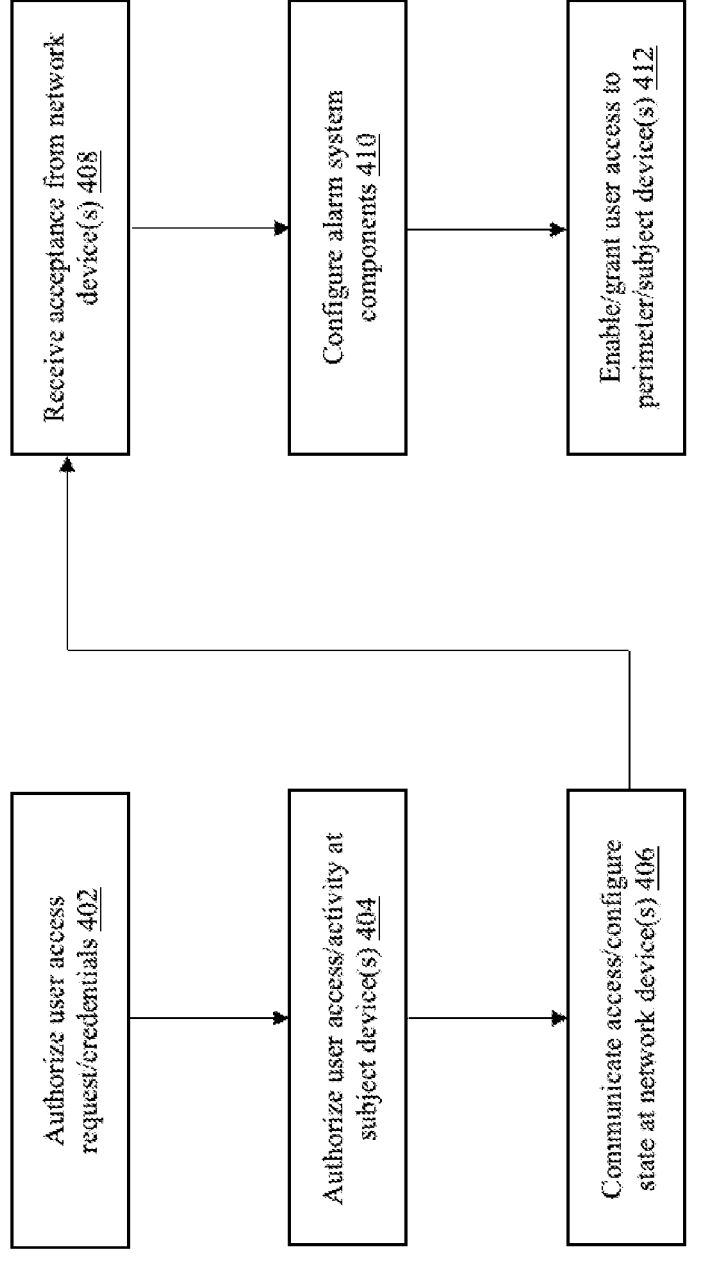
FIG. 4 is a process flow diagram of a routine within a mesh-networked site process management system, in accordance with certain aspects of the present disclosure.

Referring now to FIG. 4, a process flow diagram of a routine 400 within a mesh-networked site process management system is shown. In accordance with certain aspects of the present disclosure, the mesh-networked site process management system may comprise mesh-networked site process management system 200, as shown in FIG. 2 and one or more steps or operations of routine 400 may be executed across one or more system components of system 200. In accordance with certain aspects of the present disclosure, routine 400 may comprise one or more subroutines or sub-steps of routine 300, as shown in FIG. 3. In accordance with certain aspects of the present disclosure, routine 400 may comprise one or more steps or operations for receiving and processing access credentials from a client device. In accordance with certain aspects of the present disclosure, routine 400 may comprise one or more steps or operations for authorizing user access request data and/or user access credentials communicated from a client device to a PAP device (Step 402). Routine 400 may proceed by executing one or more steps or operations for authorizing user access permissions and/or one or more user activity parameters for one or more subject electronic devices in the mesh network of electronic devices comprising one or more EAC devices (Step 404). Routine 400 may proceed by executing one or more steps or operations for communicating the user access permissions and/or one or more user activity parameters for one or more subject electronic devices to all the electronic devices in the mesh network (Step 406). Routine 400 may proceed by executing one or more steps or operations for receiving confirmation/acceptance data from all the subject electronic devices in the mesh network in response to communicating the user access permissions and/or one or more user activity parameters for one or more subject electronic devices (Step 408). Routine 400 may proceed by executing one or more steps or operations for configuring one or more alarm system components in the mesh network (Step 410) and enabling/granting user access to the perimeter of the site and/or one or more subject electronic devices in the mesh network (Step 412).

Figure 5:
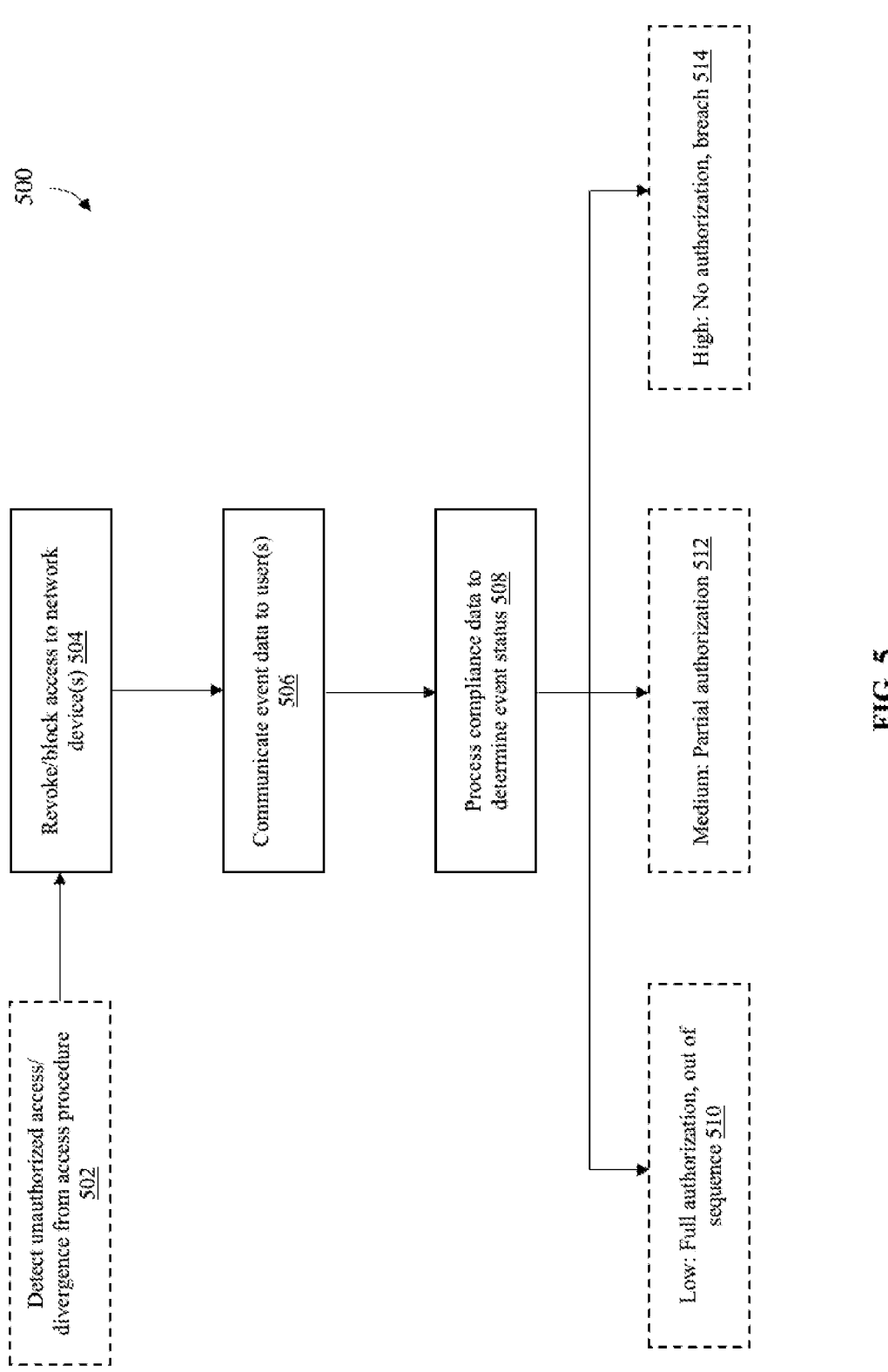
FIG. 5 is a process flow diagram of a routine within a mesh-networked site process management system, in accordance with certain aspects of the present disclosure.

Referring now to FIG. 5, a process flow diagram of a routine 500 within a mesh-networked site process management system is shown. In accordance with certain aspects of the present disclosure, the mesh-networked site process management system may comprise mesh-networked site process management system 200, as shown in FIG. 2, and one or more steps or operations of routine 500 may be executed across one or more system components of system 200. In accordance with certain aspects of the present disclosure, routine 500 may comprise one or more subroutines or sub-steps of routine 300, as shown in FIG. 3, and/or may be successive or sequential to one or more steps or operations of routine 300. In accordance with certain aspects of the present disclosure, routine 500 may comprise one or more steps or operations for detecting unauthorized access/divergence from access procedures within a mesh network of electronic devices comprising one or more EAC devices (Step 502). In response to detecting the unauthorized access/divergence from access procedures within the mesh network, routine 500 may comprise one or more steps or operations for revoking/blocking access to one or more electronic devices in the mesh network for one or more users (Step 504). In response to revoking/blocking access to one or more electronic devices, routine 500 may proceed by executing one or more steps or operations for communicating event data to one or more system users (Step 506).

Routine 500 may proceed by executing one or more steps or operations for processing one or more compliance data inputs from one or more users to determine event status for the unauthorized access/divergence from access procedures within the mesh network (Step 508). In accordance with certain aspects of the present disclosure, routine 500 may proceed by executing one or more steps or operations to categorize an event severity status as LOW (i.e., full authorization, out of sequence) (Step 510), MEDIUM (i.e., partial authorization) (Step 512) or HIGH (i.e., no authorization, breach) (Step 514).

Figure 6:
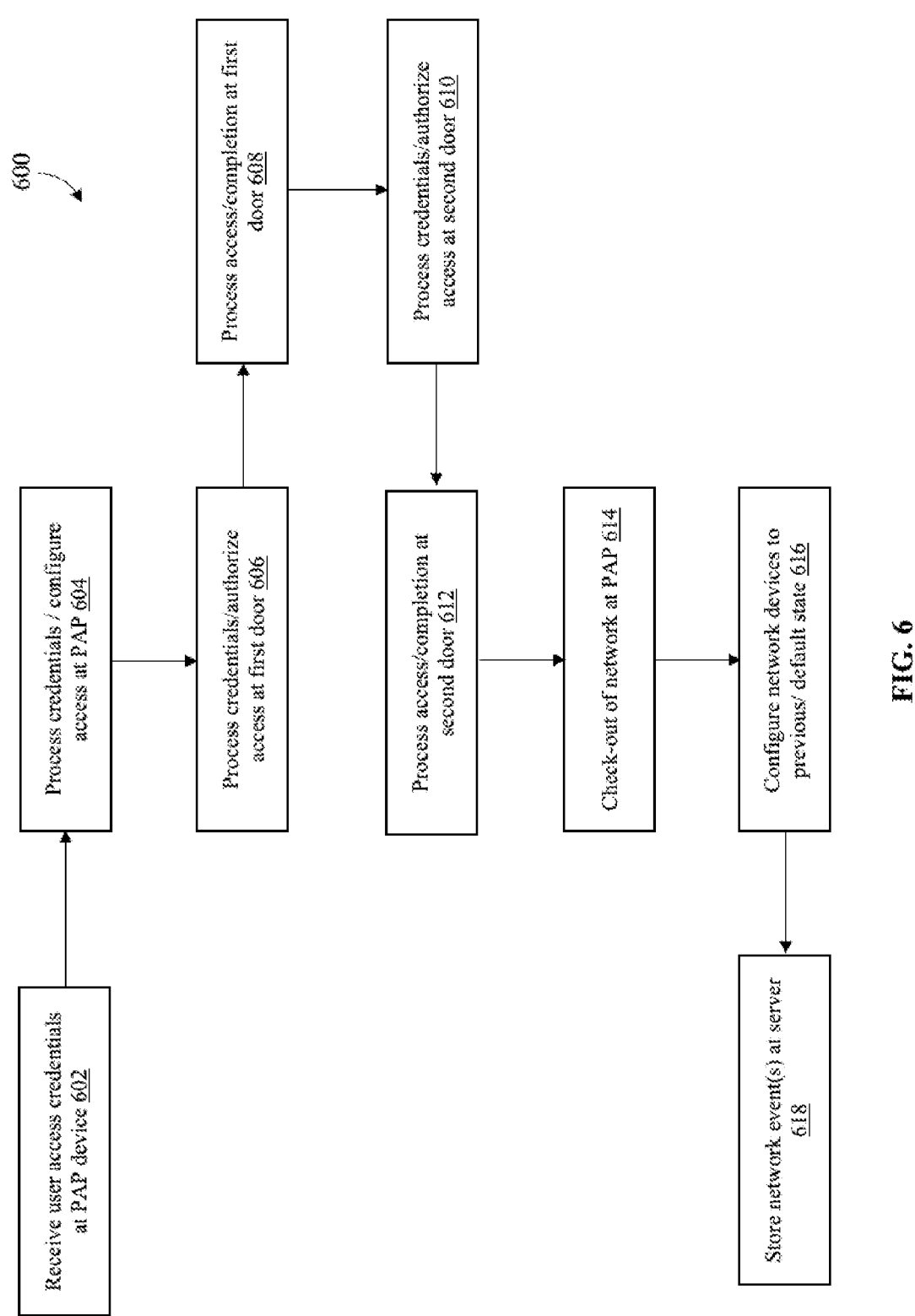
FIG. 6 is a process flow diagram of a routine within a mesh-networked site process management system, in accordance with certain aspects of the present disclosure.

Referring now to FIG. 6, a process flow diagram of a routine 600 within a mesh-networked site process management system is shown. In accordance with certain aspects of the present disclosure, the mesh-networked site process management system may comprise mesh-networked site process management system 200, as shown in FIG. 2, and one or more steps or operations of routine 600 may be executed across one or more system components of system 200. In accordance with certain aspects of the present disclosure, routine 600 may comprise one or more subroutines or sub-steps of routine 300, as shown in FIG. 3, and/or may be successive or sequential to one or more steps or operations of routine 300. In accordance with certain aspects of the present disclosure, routine 600 may comprise one or more steps or operations for receiving one or more user access credentials at a PAP device of a secured site comprising a mesh network of electronic devices comprising one or more EAC devices (Step 602). In accordance with certain aspects of the present disclosure, routine 600 may proceed by executing one or more steps or operations for processing the access credentials and configuring one or more access permissions at the PAP device (Step 604). Routine 600 may proceed by executing one or more steps or operations for processing the user credentials to grant access to an electronic access control device of a first door of the secured site (Step 606). In accordance with certain aspects of the present disclosure, routine 600 may proceed by executing one or more steps or operations for processing one or more user access and/or activity completion event at the first door (Step 608). In accordance with certain aspects of the present disclosure, routine 600 may proceed by executing one or more steps or operations for processing the user credentials and the access data from the first door to grant access to an electronic access control device of a second door of the secured site (Step 610). In accordance with certain aspects of the present disclosure, routine 600 may proceed by executing one or more steps or operations for processing one or more user access and/or activity completion event at the second door (Step 612). In accordance with certain aspects of the present disclosure, routine 600 may proceed by executing one or more steps or operations for completing a check-out workflow or scheme for checking the user out of the mesh network at the PAP device (Step 614). In accordance with certain aspects of the present disclosure, routine 600 may proceed by executing one or more steps or operations for configuring the electronic devices in the mesh network to a previous or default state of operation/machine state (Step 616). In accordance with certain aspects of the present disclosure, routine 600 may proceed by executing one or more steps or operations for communicating and storing device activity data and/or event data at one or more local or remote servers (Step 618).

Figure 7:
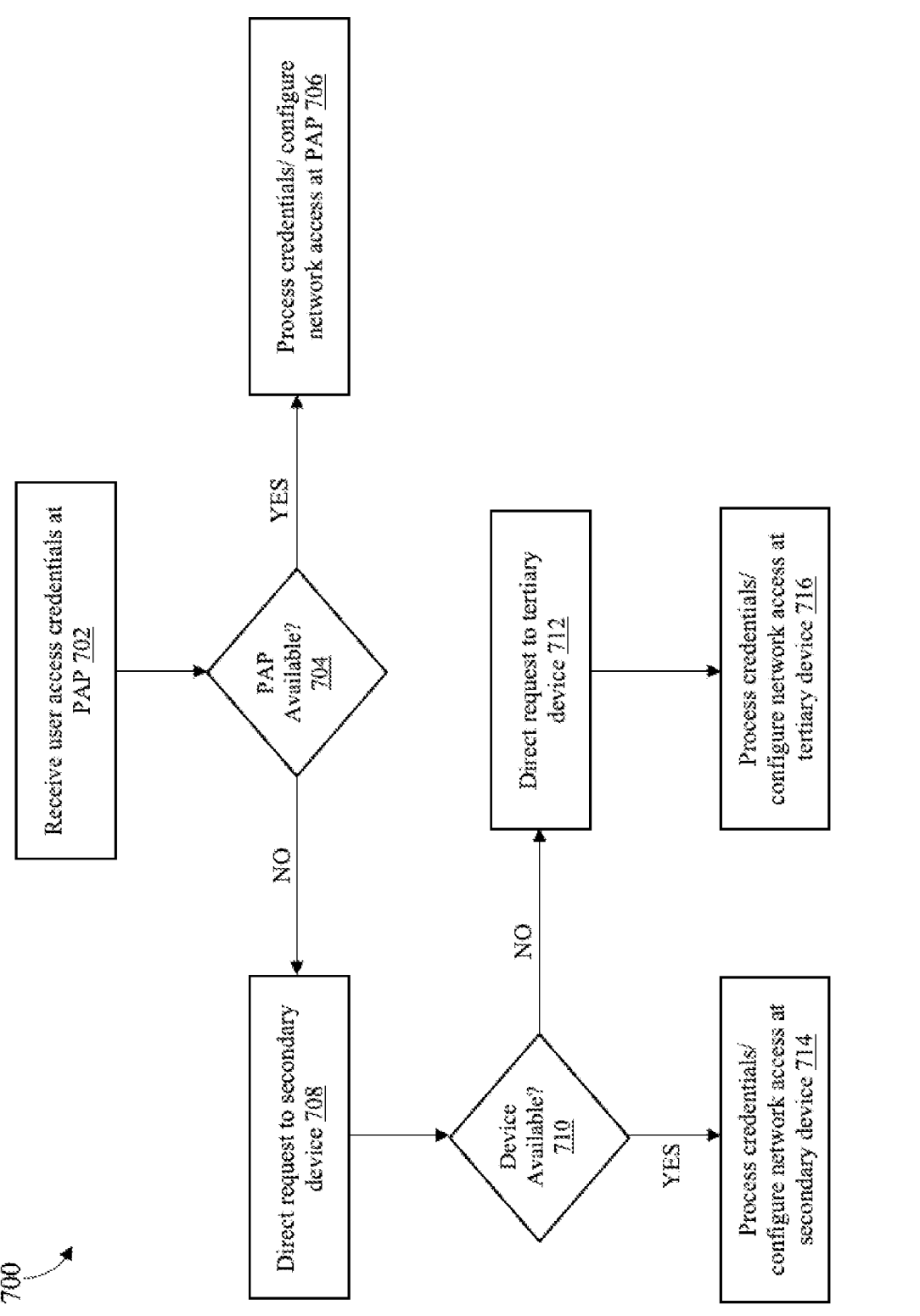
FIG. 7 is a process flow diagram of a routine within a mesh-networked site process management system, in accordance with certain aspects of the present disclosure.

Referring now to FIG. 7, a process flow diagram of a routine 700 within a mesh-networked site process management system is shown. In accordance with certain aspects of the present disclosure, the mesh-networked site process management system may comprise mesh-networked site process management system 200, as shown in FIG. 2, and one or more steps or operations of routine 700 may be executed across one or more system components of system 200. In accordance with certain aspects of the present disclosure, routine 700 may comprise one or more subroutines or sub-steps of routine 300, as shown in FIG. 3, and/or may be successive or sequential to one or more steps or operations of routine 300. In accordance with certain aspects of the present disclosure, routine 700 may comprise one or more steps or operations for determining an availability of a primary PAP device at a secured location and, conditionally, assigning a secondary or tertiary electronic device in a mesh network comprising one or more EAC devices as the PAP device. In accordance with certain aspects of the present disclosure, routine 700 may commence by executing one or more steps or operations for receiving one or more user access credentials as a primary PAP device (Step 702). Routine 700 may proceed by executing a decision step to determine whether the primary PAP device is available to process the user access credentials (Step 704). If YES, routine 700 proceeds by executing one or more steps or operations for processing the user credentials and configuring access to one or more electronic devices in the mesh network at the primary PAP device (Step 706). If NO, routine 700 proceeds by executing one or more steps or operations for directing the user access credentials to a secondary device in the mesh network (Step 708). Routine 700 may proceed by executing a decision step to determine whether the secondary device is available to process the user access credentials (Step 710). If YES, routine 700 proceeds by executing one or more steps or operations for processing the user credentials and configuring access to one or more electronic devices in the mesh network at the secondary device (Step 714). If NO, routine 700 proceeds by executing one or more steps or operations for directing the user access credentials to a tertiary device in the mesh network (Step 712) and processing the user credentials and configuring access to one or more electronic devices in the mesh network at the tertiary device (Step 716).

Figure 8:
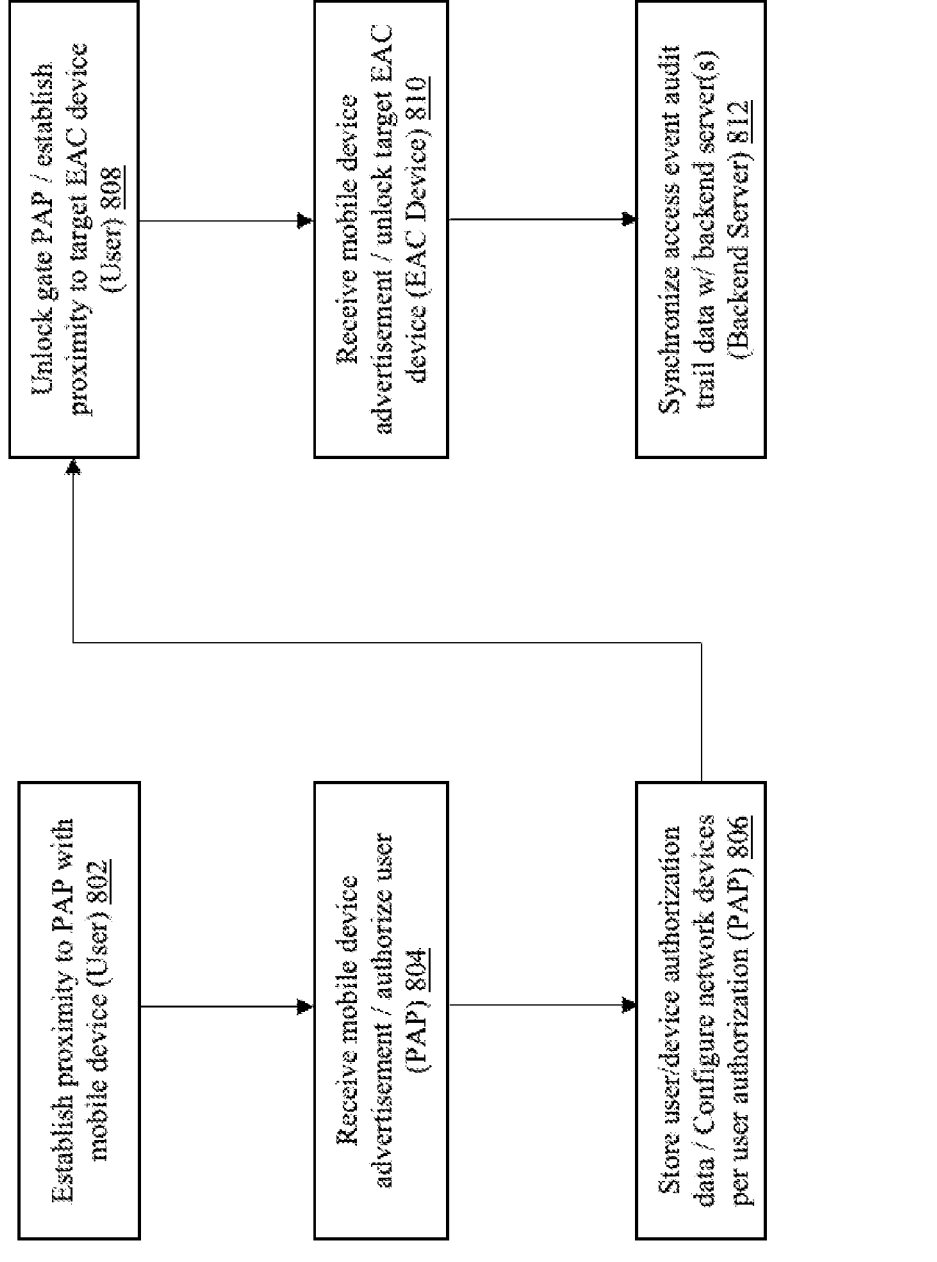
FIG. 8 is a process flow diagram of a method for site process management within a mesh networked site, in accordance with certain aspects of the present disclosure.

Referring now to FIG. 8, a process flow diagram of an EAC method 800 within a secured mesh networked site is shown. In accordance with certain aspects of the present disclosure, method 800 may be implemented within system 200, as shown in FIG. 2. In accordance with certain aspects and advantages of method 800, a secured mesh networked site may be configured wherein a first meshed device may be configured as a PAP device configured to authorize user access to other meshed devices on the network. A user of a mobile access control device (e.g., a smartphone) may approach the PAP device to establish proximity for a wireless communication protocol (e.g., BLUETOOTH advertisement) between the mobile access control device and the PAP device. The PAP device may be configured to automatically receive and process a data packet containing user authorization/identification data from the mobile access control device and actuate a locking mechanism of the PAP device without requiring additional authorization steps. The user authorization/identification data can be achieved through BLE and other wireless devices comprising a software application executing thereon that is configured to automatically send/communicate the user authorization/identification data for the temporary access session.

In accordance with certain aspects of the present disclosure, method 800 may begin by executing one or more steps or operations for establishing a proximity between a PAP device and a mobile user device by a user at secured mesh networked site (Step 802). Method 800 may proceed by executing one or more steps or operations for receiving, at the PAP device, a wireless communication (e.g., BLUETOOTH advertisement) comprising a data packet comprising user/device authorization data from the mobile user device and processing the user/device authorization data to authorize the user to access the secured mesh networked site (Step 804). Method 800 may proceed by executing one or more steps or operations for storing the user/device authorization data and configuring, with the PAP device, the other mesh networked devices to configure network/device access parameters according to the user/device authorization data (Step 806). Method 800 may proceed by executing one or more steps or operations for actuating an electronic locking mechanism of the PAP device to grant access to the user to the perimeter of the secured mesh networked site (Step 808). In accordance with certain aspects of the present disclosure, the user proceeds to an EAC device at a target location within the secured mesh networked site according to the user/device authorization data. Method 800 may proceed by executing one or more steps or operations for receiving, with the EAC device at the target location within the secured mesh networked site, a wireless communication (e.g., BLUETOOTH advertisement) comprising a data packet comprising the user/device authorization data from the mobile user device and processing the user/device authorization data to grant access/unlock the EAC device (Step 810). Method 800 may proceed by executing one or more steps or operations for synchronizing access event audit trail data between the PAP device and/or other mesh networked devices with one or more backend servers for the secured mesh networked site (Step 812).

Figure 9:
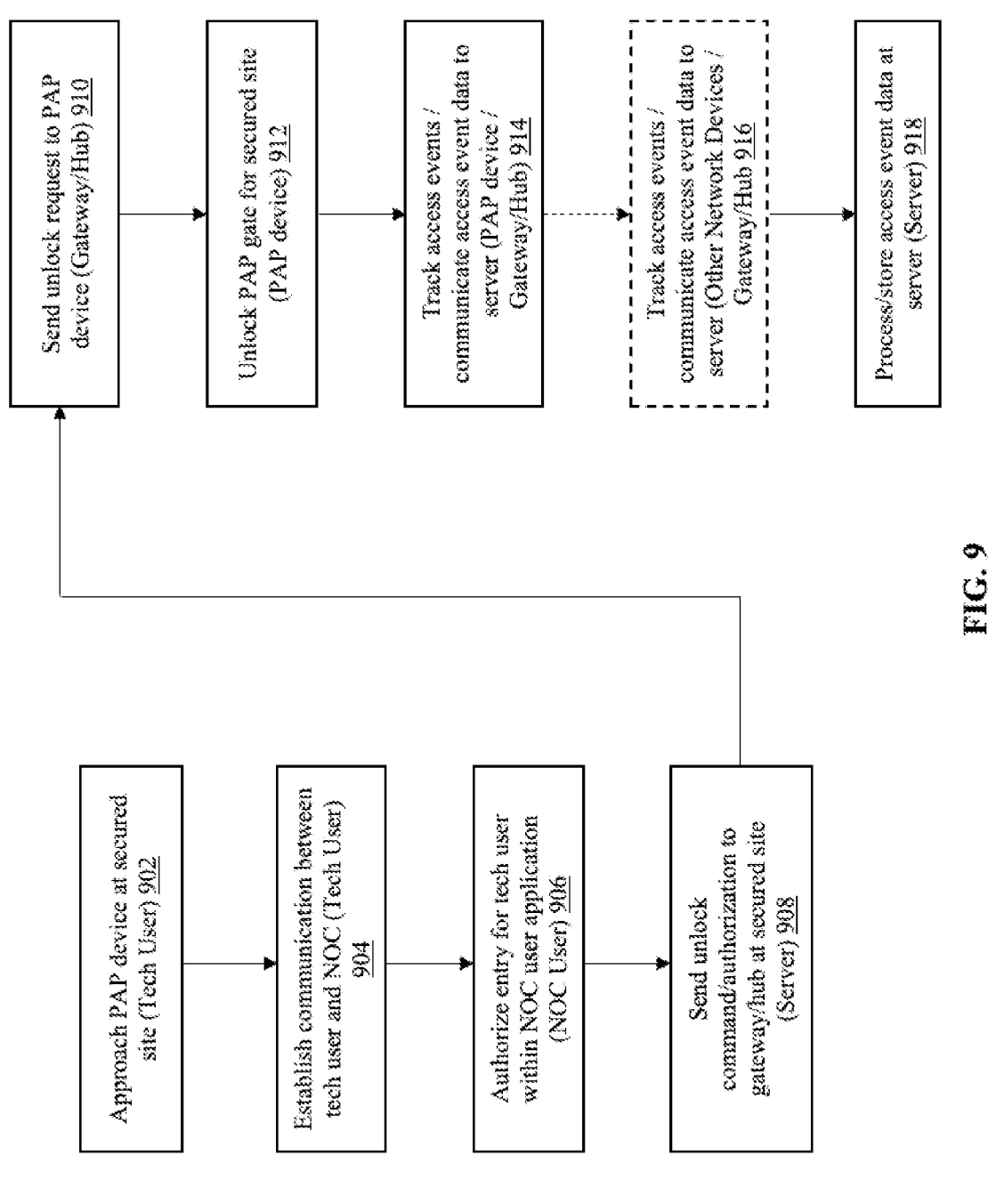
FIG. 9 is a process flow diagram of a method for site process management within a mesh networked site, in accordance with certain aspects of the present disclosure.

Referring now to FIG. 9, a process flow diagram of an EAC method 900 within a secured mesh networked site is shown. In accordance with certain aspects of the present disclosure, method 800 may be implemented within system 200, as shown in FIG. 2. In accordance with certain aspects of the present disclosure, the secured mesh networked site may be configured such that a first meshed device may be configured as a PAP device for one or more other meshed devices in the secured mesh network. In certain embodiments, the first meshed device and/or the one or more other meshed devices may be communicably engaged via one or more communications protocol and network interface (e.g., LTE, 5G and the like). The first meshed device and/or the one or more other meshed devices may be communicably with one or more backend cloud or enterprise servers via the network interface. In accordance with certain aspects of method 900, a support user at a network operations center (NOC) may receive a phone call from a technician user in proximity to a PAP device securing a gate/access point of the secured site. The technician user may request access from the support user. The support user may sign into a server application to request/send an unlock command to the meshed cellular device which, in turn, sends a message via BLE on the mesh network to unlock the PAP device securing the gate. The technician user unlocks the gate and enters while the PAP and meshed cellular device records the access event audit trail in real-time (or at periodic intervals) to the back-end servers.

In accordance with certain aspects of the present disclosure, method 900 may begin upon a technician user approaching a PAP device at a perimeter of a secured mesh networked site (Step 902). Method 900 may proceed by executing one or more steps or operations for establishing a communications interface (e.g., phone call) between the technician user and a support user at the NOC (Step 904).

Method 900 may proceed by the support user executing one or more steps or operations within a NOC user application to authorize entry for the technician user to enter the perimeter of the secured mesh networked site (Step 906). Method 900 may proceed by executing one or more steps or operations for sending an unlock command and/or user authorization from one or more NOC servers to a cellular-enabled device (e.g., a gateway device or mesh hub device) at the secured mesh networked site (Step 908). Method 900 may proceed by executing one or more steps or operations for sending an unlock authorization/request from the cellular-enabled device to PAP device to grant access to the technician user at the perimeter of the secured mesh networked site (Step 910). Method 900 may proceed by executing one or more steps or operations for actuating an electronic locking mechanism of the PAP device to grant access to the user to the perimeter of the secured mesh networked site (Step 912). Method 900 may proceed by executing one or more steps or operations for tracking access event/audit trail data with the PAP device (Step 914) and/or one or more other network devices (Step 916) and communicating the access event/audit trail data to the one or more NOC server via the cellular-enabled device. Method 900 may proceed by executing one or more steps or operations for processing and storing the access event/audit trail data at the one or more NOC server (Step 918).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, option-ally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An electronic access control method, comprising:

establishing, with a mobile electronic device, a data transfer interface between the mobile electronic device and a perimeter access point device, wherein the perimeter access point device comprises a node in a mesh network, wherein the mesh network comprises a plurality of electronic access control devices configured to electronically secure one or more access points for a location;

receiving, with the perimeter access point device, an access credential communicated from the mobile electronic device via the data transfer interface;

processing, with at least one processor communicably engaged with the perimeter access point device, the access credential to authorize access to the perimeter access point device;

processing, with the at least one processor, the access credential to authorize access to a specific electronic access control device in the plurality of electronic access control devices and restrict access to non-authorized electronic access control devices in the plurality of electronic access control devices;

configuring, with the at least one processor, one or more assigned task for the specific electronic access control device in the plurality of electronic access control devices, wherein the one or more assigned task comprises a check-out workflow for the perimeter access point device and the specific electronic access control device;

after a user has accessed the specific electronic access control device for an authorized purpose, providing, by the perimeter access point device, the check-out workflow to the user via the mobile electronic device;

receiving, at the perimeter access point device, an acceptance of the one or more assigned task from the specific electronic access control device;

updating, with at least one server communicably engaged with the perimeter access point device, one or more alarm system parameters in response to configuring the one or more assigned task, wherein updating the one or more alarm system parameters comprises suppressing an alarm for the perimeter access point device and the specific electronic access control device and arming an alarm for the non-authorized electronic access control devices in the plurality of electronic access control devices;

receiving, with the perimeter access point device, one or more user-generated inputs from the user via the mobile electronic device according to the check-out workflow;

determining, with the at least one processor, a lock state for the perimeter access point device and the specific electronic access control device according to the check-out workflow, wherein determining the lock state comprises verifying a task completion status at the specific electronic access control device, wherein the task completion status comprises a confirmation communicated from the specific electronic access control device that the specific electronic access control device has been returned to a locked state;

enabling, with the at least one processor, a lock state update at the perimeter access point device upon successful verification of the task completion status; and restoring, with the at least one server, the alarm for the perimeter access point device and the specific electronic access control device in response to determining the lock state for the perimeter access point device and the specific electronic access control device according to the check-out workflow, wherein restoring comprises configuring the plurality of electronic access control devices in the mesh network to a previous or default operational state.

2. The electronic access control method of claim 1 further comprising monitoring, with at least one sensor or camera communicably engaged with the at least one server in the mesh network, a plurality of access event data for the specific electronic access control device in the plurality of electronic access control devices, wherein the plurality of access event data is stored at the at least one server.

3. The electronic access control method of claim 2 wherein monitoring the plurality of access event data further comprises verifying an event completion by correlating stored access event data with real-time sensor or camera data captured concurrently with the one or more user-generated inputs.

4. The electronic access control method of claim 1 further comprising establishing, with the mobile electronic device, a second data transfer interface between the mobile electronic device and the specific electronic access control device.

5. The electronic access control method of claim 4 wherein the specific electronic access control device is configured to grant access to a user of the mobile electronic device in response to establishing the second data transfer interface.

6. The electronic access control method of claim 5 further comprising receiving, with the at least one server, at least one input indicative of completion of the one or more assigned task from one or both of the specific electronic access control device and the perimeter access point device.

7. The electronic access control method of claim 6 further comprising configuring, with the at least one server, the plurality of electronic access control devices in the mesh network to a first state in response to receiving the at least one input indicative of completion of the one or more assigned task from one or both of the specific electronic access control device and the perimeter access point device.

8. The electronic access control method of claim 1 wherein the check-out workflow comprises receiving at least one real-time user-generated confirmation input, indicative of a physical action completed by the user, from the mobile electronic device prior to determining the lock state for the perimeter access point device and the specific electronic access control device.

9. The electronic access control method of claim 1 wherein suppressing the alarm occurs only upon initiation and assignment of the check-out workflow, and restoring the alarm occurs automatically upon workflow completion confirmation specifically received from the mobile electronic device.

10. The electronic access control method of claim 1, further comprising cross-validating the received access credential between at least two electronic access control devices in the mesh network prior to authorizing access.

11. An electronic access control system, comprising:

a mobile electronic device associated with a user of the electronic access control system;

a server communicably engaged with the mobile electronic device to communicate one or more electronic access credentials to the mobile electronic device; and a plurality of electronic access control devices operably installed at a secured location comprising at least one perimeter access point, wherein the plurality of electronic access control devices is communicably engaged with the server in a mesh network configuration, wherein at least one electronic access control device in the plurality of electronic access control devices comprises a perimeter access point device for the secured location, wherein the mobile electronic device is configured to provide an electronic access credential to the perimeter access point device, wherein the perimeter access point device is configured to process the electronic access credential to grant or deny access to a perimeter access point for the secured location, wherein the perimeter access point device is configured to process the electronic access credential to authorize access to a specific electronic access control device in the plurality of electronic access control devices and restrict access to non-authorized electronic access control devices in the plurality of electronic access control devices, wherein the perimeter access point device is configured to assign one or more task for the specific electronic access control device in the plurality of electronic access control devices, wherein the one or more task comprises a check-out workflow for the perimeter access point device and the specific electronic access control device, wherein, after the user has accessed the specific electronic access control device for an authorized purpose, the perimeter access point device is configured to provide the check-out workflow to the user via the mobile electronic device, wherein the server is configured to update one or more alarm system parameters in response to the one or more task, wherein updating the one or more alarm system parameters comprises suppressing an alarm for the perimeter access point device and the specific electronic access control device and arming an alarm for the non-authorized electronic access control devices in the plurality of electronic access control devices, wherein the perimeter access point device is configured to receive one or more user-generated inputs from the mobile electronic device according to the check-out workflow, wherein the server is configured to determine a lock state for the perimeter access point device and the specific electronic access control device according to the check-out workflow, wherein determining the lock state comprises verifying a task completion status at the specific electronic access control device, wherein the task completion status comprises a confirmation communicated from the specific electronic access control device that the specific electronic access control device has been returned to a locked state, wherein the server is further configured to enable a lock state update at the perimeter access point device upon successful verification of the task completion status, wherein the server is configured to restore the alarm for the perimeter access point device and the specific electronic access control device in response to determining the lock state for the perimeter access point device and the specific electronic access control device according to the check-out workflow, and wherein restoring comprises configuring the plurality of electronic access control devices in the mesh network configuration to a previous or default operational state.

12. The electronic access control system of claim 11 further comprising at least one motion sensor or camera installed in the secured location, wherein the at least one motion sensor or the camera are communicably engaged with the server.

13. The electronic access control system of claim 12 wherein the server is configured to store data received from the at least one motion sensor or the camera in response to the user of the electronic access control system accessing the at least one perimeter access point.

14. The electronic access control system of claim 11 wherein the mobile electronic device is configured to communicate the electronic access credential to the specific electronic access control device.

15. The electronic access control system of claim 14 wherein the specific electronic access control device is configured to grant access to the user in response to receiving the electronic access credential from the mobile electronic device.

16. The electronic access control system of claim 15 wherein the specific electronic access control device is configured to communicate one or more activity data inputs to one or both of the server and the perimeter access point device.

17. The electronic access control system of claim 16 wherein the one or more activity data inputs comprise a confirmation that the specific electronic access control device has been returned to a locked state.

18. The electronic access control system of claim 17 wherein the server is configured to restore the plurality of electronic access control devices to a prior state in response to processing the confirmation that the specific electronic access control device has been returned to the locked state.

19. The electronic access control system of claim 11 wherein the server is configured to assign the at least one electronic access control device in the plurality of electronic access control devices as the perimeter access point device for the secured location.

20. The electronic access control system of claim 19 wherein the server is configured to assign one or more alternative perimeter access point devices in the plurality of electronic access control devices for the secured location.

* * * * *